Figure 1:
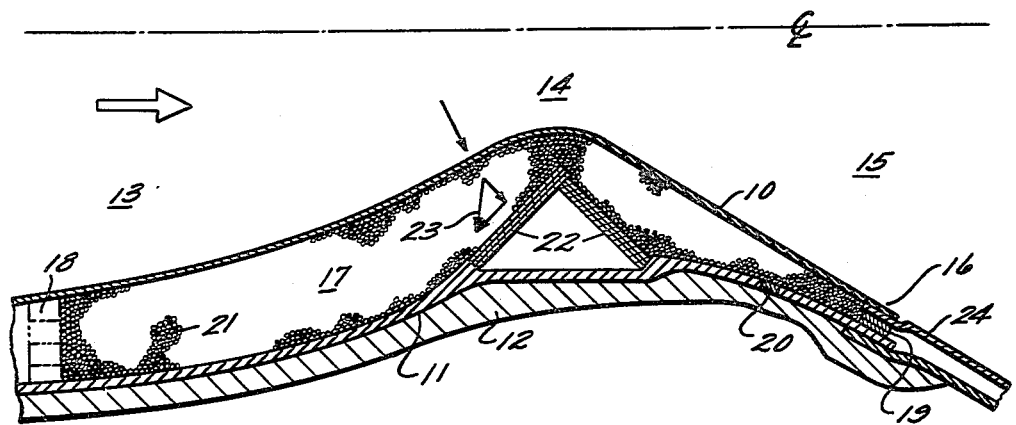

Dec. 3, 1963 G. W. ELLENBURG ET AL 3,112,614
COMPOSITE PROPULSION NOZZLE
Filed Oct. 23, 1961

INVENTORS.
GEORGE W. ELLENBURG
HERBERT H. SPECHT
By John F. Cullen
ATTORNEY

United States Patent Office 3,112,614
Patented Dec. 3, 1963

3,112,614
COMPOSITE PROPULSION NOZZLE
George Warren Ellenburg, San Bernardino, Calif., and Herbert H. Specht, Cincinnati, Ohio, assignors to General Electric Company, a corporation of New York
Filed Oct. 23, 1961, Ser. No. 146,712
6 Claims. (Cl. 60—35.6)

The present invention relates to a composite propulsion nozzle and, more particularly, to a propulsion nozzle and combustion chamber for reaction engines such as may be used on a rocket.

There are structures such as uncooled liquid rocket thrust chambers and solid propellent rocket nozzles which operate at high temperatures and pressures. A difficulty encountered in these structures is the transition from ambient temperatures to high temperature which takes place relatively slow in comparison to the rate of rise of the pressure. That is, when the rocket is fired, an instantaneous pressure rise takes place followed by high temperature rise. Such phenomena impose very high hoop and thermal stresses on the structure. It is possible to provide a liner which can take either temperature rise or pressure rise but difficulties are encountered when it is subjected to both. For example, a liner can be constructed which will withstand the pressure developed on firing but its strength falls off when it is subjected to the sudden temperature rise. Previous art has utilized relatively rigid liner backup structure for such refractory material liners as tungsten and graphite in its various forms. These are able to adequately take care of the pressure at low temperatures, however the combined thermal stresses across the refractory liner together with the stresses imposed by the overall temperature rise, which are compressive stresses, cause the liners to deform in compression. Such results preclude repeated utilization of the device. In other words, it is insufficient to merely back up a liner with a rigid structure because, upon heating, the thermal stresses cause the liner to buckle since it elongates. Further, it is possible to make the liner thick enough to withstand the pressure and sudden temperature rise but this is not practical in large sizes. Merely making the liner thick enough, while practical for small sizes, is not practical in the large sizes since, as the diameter gets larger, the hoop stresses get higher. Further, there is a limit to how thick the liner may be made. When the liner is made of tungsten the thermal stress across the tungsten causes it to break of its own accord in the larger sizes. That is, the tungsten is subjected to thermal shock similar to that of applying heat to one side of a piece of glass and ice water to the other side. It merely cracks and breaks.

Thus, in the large size nozzles there must be provision to allow the inner liner to carry the load during the period of time that it is heating up until its strength begins to drop off and then provision to pick up the load elsewhere to provide the load carrying capacity required.

The main object of the present invention is to provide a composite propulsion nozzle which is so constructed as to relieve the stress gradient across the liner itself by adding an insulator behind it.

A further object is to provide such a composite structure wherein the insulator is a substance having a non-liner spring rate.

A further object is to provide such a composite nozzle structure wherein the insulator is light weight and permits the translation of forces from the liner sideways downstream to permit expansion of the liner.

Briefly stated, the present invention is directed to a composite nozzle structure having a relatively thin inner liner exposed to the hot exhaust gases. This liner is backed up by a spaced outer casing to define a hollow annular space therebetween. The annular space between the liner and casing is filled with carbon balls and the outer casing is provided with a ring-like member extending toward the liner against which the balls may act to transmit axial forces on the liner to the casing.

Figure 2:
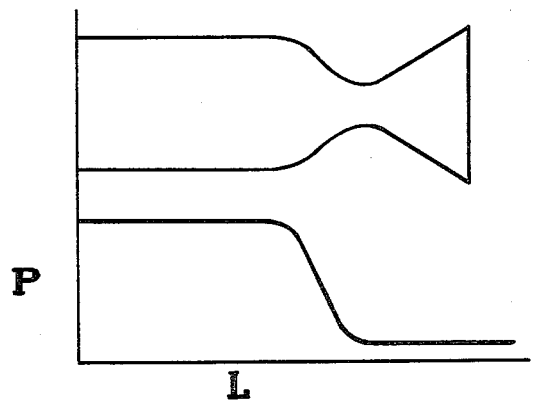

While the specification concludes with claims particularly pointing out and distinctly claiming the subject matter which we regard as our invention, it is believed the invention will be better understood from the following description taken in connection with the accompanying drawing in which:

FIGURE 1 is a cross sectional view illustrating one side of a symmetrical composite nozzle structure in accordance with the invention; and, FIGURE 2 illustrates the pressure gradient across a typical rocket combustion chamber-nozzle structure.

As previously stated, a nozzle liner, which is the structure immediately exposed to the hot exhaust gases, is subjected to pressure and thermal stresses. In a rocket, immediately upon firing the rocket the pressure in the combustion chamber is high and this continues through the throat section and drops off in the diverging portion of the nozzle. Thus, the liner must be strong enough to withstand the sudden pressure increase. Almost immediately following the pressure increase is a sudden temperature rise which, in a rocket, jumps to the neighborhood of 5000° F. Liners made of tungsten and various graphite materials can be constructed to withstand the pressure but are subjected to thermal shock upon the sudden imposition of the tremendous temperature rise. Since expansion takes place under temperature increase the liner grows and actually introduces a greater stress, in the form of a hoop stress, in the outer portion of the liner than it would have if it were cold. Thus, a high stress gradient is imposed across the liner. Merely backing the liner with a strong material does not permit the liner to expand under the temperature increase so is unsatisfactory. Further, the problem becomes more complex as the liner diameter is increased for the larger sizes of engines.

Referring first to FIGURE 1, the present invention is illustrated as applied to a rocket nozzle. It should be appreciated, however, that the composite structure illustrated lends itself well to any structure subjected to sudden pressure and temperature rises wherein the surface is non-planar or is curved and the nozzle shown is merely illustrative since it is within this environment that the invention was conceived.

The composite structure of the invention is composed of an inner liner 10 that may be relatively thin in cross section as shown. The liner may be made of tungsten and graphite in its various forms as is conventional and will be a one piece structure. In order to permit the liner to expand under the temperature increase and, prior to that, to withstand its shape under the pressure increase, an outer casing 11 is spaced from the liner. This casing, for ease of manufacture, may be made in two parts and cupped around the liner and held in place by strand wound fiber glass 12 which is molded to the outer casing. In the form of a propulsion nozzle, the liner is shaped to form a combustion zone 13 and then converges to a throat 14 and then diverges in portion 15 to the downstream end 16. It can be seen that the outer casing 11 is generally conformed to the liner shape. The spacing of the outer casing 11 from the liner 10 provides an annular space 17 between the two members. In order to close the annular space suitable sealing means diagrammatically indicated at 18 is provided upstream of the throat and in the upstream end of the combustion zone and a second sealing means 19 is provided downstream of the throat at the end of the diverging portion 15 to provide a closed annular space 17 between the liner and casing.

Since the liner must withstand the pressure rise as well as the sudden temperature rise following it is apparent that the liner 10 is insufficient to do this as shown. To permit this, the annular space 17 is completely filled, through a suitable filling plug 20, with carbon balls 21.

The significance of the carbon balls is tri-fold. These balls provide an excellent insulation between the liner 10 and the casing 11, they provide a variable spring rate compressive medium to transmit the pressure loads of the inner liner to the outer liner as the inner liner loses its ability to maintain tensile stresses because of its increased expansion as the temperature rises toward the steady state condition. The carbon balls also distribute the load over the liner surface without producing stresses that might be encountered due to poor local fits.

As to the first function of the carbon balls, it can be seen that a large amount of unoccupied space is present providing air for insulating purposes and the liner and casing are effectively insulated from one another. As to the second feature, it is well known that the balls will not act as a fluid, transmitting pressure in all directions but, like a stack of cannon balls, transmit pressure in a cone and act as a variable spring having a non-linear pressure transmitting characteristic. That is, as the balls tighten up under pressure application, they tend to resist more and more the application of pressure non-linearly. Thus, as the balls are squeezed under the application of pressure they become in effect a solid wall to transmit the pressure to the outer casing which takes the ultimate load. Further, the use of the carbon balls permits the stiffening to take place inversely as the properties of the liner drop off. In other words, as the liner tends to soften under the temperature rise and weaken in its pressure resisting qualities, it is at this time that the balls tighten up and back up the liner to provide the feature that the liner has lost under temperature—thus the inverse characteristic of the use of the carbon balls. Thus, the third feature is met, that is the ability to distribute the load over the liner surface without producing stresses due to poor fits or imperfections in manufacture.

The mere use of the carbon balls between the liner and the casing as thus far described would tend to permit the liner to flatten out by a realignment of the balls were it not for an additional piece of structure present. This structure is provided by a ring-like member 22 which is secured to the casing member 11 on the inner surface thereof at the throat section 14 and extends toward the liner 10 and is spaced therefrom. This ring-like member may conveniently be in the form of a cone in transverse cross section as seen in FIGURE 1 and extends around the liner at the throat and radially towards the liner. Since the carbon balls transmit force in a cone-like direction and not as a fluid it can be seen that the normal pressure applied by the arrow to the inner surface of the liner at the throat portion will, by the force diagram 23 resolve itself into a force normal to the ring member and thus hold the shape of the inner liner. This occurs when the balls have become squeezed tight and are unable to flow. Thus, the ring transmits the axial forces in the liner to the casing member permitting the liner to retain its shape. The particular size of the carbon balls will vary in accordance with design criteria and can generally vary from fifteen to one hundred thousandth of an inch in diameter so they are relatively small.

Referring to FIGURE 2 the pressure distribution across a typical rocket combustion chamber-nozzle is shown plotted as pressure versus length wherein it can be seen that the pressure in the combustion chamber is high and drops off at the throat and then is low throughout the diverging portion of the nozzle. Thus, it is necessary that the liner 10 be restrained at the throat portion where the pressure is high and it is at this portion or substantially at the throat portion that the ring-like member 22 is provided. Furthermore, the throat portion is the hottest part so is the portion which requires backing up since it is the first to weaken under the temperature increase.

Since the pressure as well as the temperature at the downstream end of the nozzle falls off rapidly, suitable extension cones 24 may be added if required downstream of the supported liner and no carbon balls are required in this area.

The clearance between the apex of the ring-like member and the inner liner is not critical but is merely that required to take up manufacturing tolerances. Since the balls will not flow as a liquid they cannot flow through this clearance once the pressure has been applied and the balls have tightened up to pack the space between the liner and casing to transmit the force to the casing.

It can be seen that the composite structure disclosed with the carbon balls permits a very effective insulation between the liner and the casing and provides a variable spring rate medium to transmit the pressure loads from the inner liner to the outer liner as the inner liner loses its strength because of temperature rise. In addition, the carbon balls distribute the load evenly without producing local stresses. The addition of the ring-like member 22 retains the throat shape on the inner liner at the hottest part of the structure.

While we have hereinbefore described a preferred form of our invention, obviously many modifications and variations of the present invention are possible in the light of the above teachings. It is therefore to be understood that within the scope of the appended claims, the invention may be practiced otherwise than as specifically described.

We claim:

1. A composite curved structure subjected to a temperature rise and a faster pressure rise comprising, a first liner member exposed to the temperature and pressure rise, a second casing member spaced from the first member to define a closed space therebetween, carbon balls filling said space between the members, and a ring-like member secured to the second casing member and extending toward said first liner member to transmit axial forces on the first member through the balls to the second member.

2. A composite coned structure subjected to a temperature rise and a faster pressure rise comprising, a first inner liner member exposed to the temperature and pressure rise, a second casing member surrounding and spaced from the first member to define a closed space therebetween, carbon balls filling said space between the members, and a ring-like member secured to the second casing member substantially at the smallest diameter of the coned structure and extending toward said first liner member to transmit axial forces on the first member through the balls to the second member.

3. A composite reaction propulsion nozzle comprising a first inner liner member subjected to hot exhaust gases, a second casing member surrounding and spaced from the inner liner and generally conforming in shape thereto to define a closed hollow annular space therebetween, carbon balls disposed in and filling said annular space, a ring-like member secured to the casing member on the inner surface thereof and extending towards said liner and spaced therefrom, said balls acting on said ring member to transmit axial forces on the liner to said casing member.

4. A composite reaction propulsion nozzle comprising, a first inner liner member subjected to the hot exhaust gases and shaped to form a combustion zone, a converging portion to a throat and a diverging portion to the downstream end, a second casing member surrounding and spaced from the inner liner and generally conforming in shape thereto, means sealing the space between the liner and casing upstream and downstream of the throat to define a closed annular space, carbon balls disposed in and filling said annular space, a ring-like member secured to the casing member on the inner surface thereof substantially at the throat and extending towards said liner, said balls acting on said ring member to transmit axial forces on the liner to said casing member.

5. Apparatus as described in claim 4 wherein said ring-like member is cone shaped in transverse cross section and the apex of said cone is spaced from the inner liner.

6. A composite rocket nozzle comprising, an inner one piece liner subjected to the hot exhaust gases and shaped to form a combustion zone, a converging portion to a throat and a diverging portion to the downstream end, a casing surrounding and spaced from the liner, means in the upstream end of the combustion zone and downstream end of the diverging portion sealing the liner and casing to define a closed annular space therebetween, carbon balls disposed in and filling said annular space, a ring member secured to said casing and cone shaped in transverse cross section, said ring member extending around said liner at the throat thereof and extending radially towards said liner, said balls acting on said ring member to transmit axial forces on the liner to said casing member.

No references cited.